Oct. 16, 1956      V. A. JOHNSON      2,766,550
RAT TRAP
Filed April 16, 1954      2 Sheets-Sheet 2
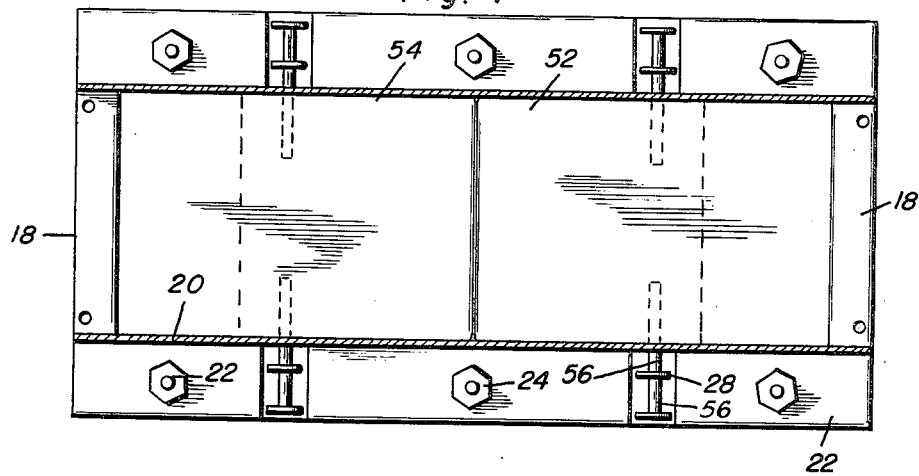
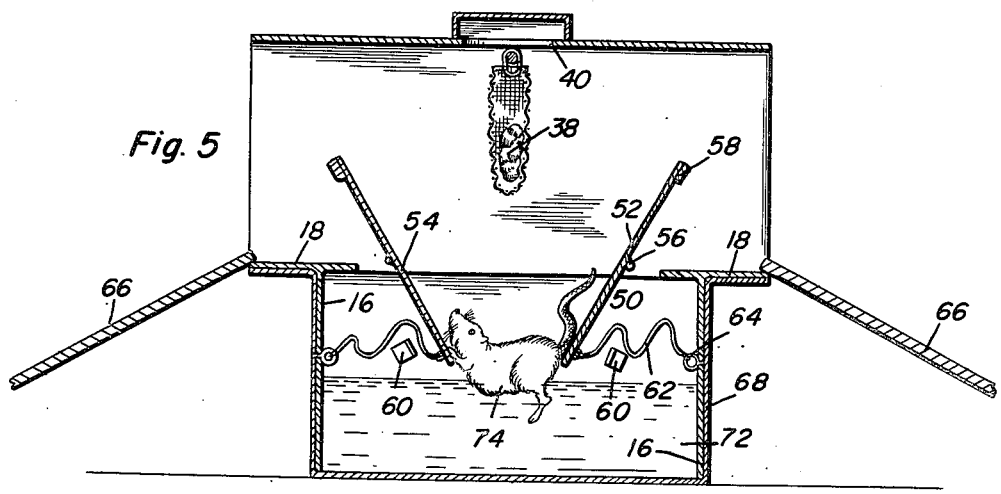
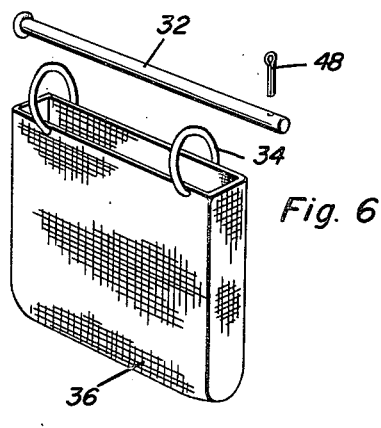
Verne A. Johnson
INVENTOR.

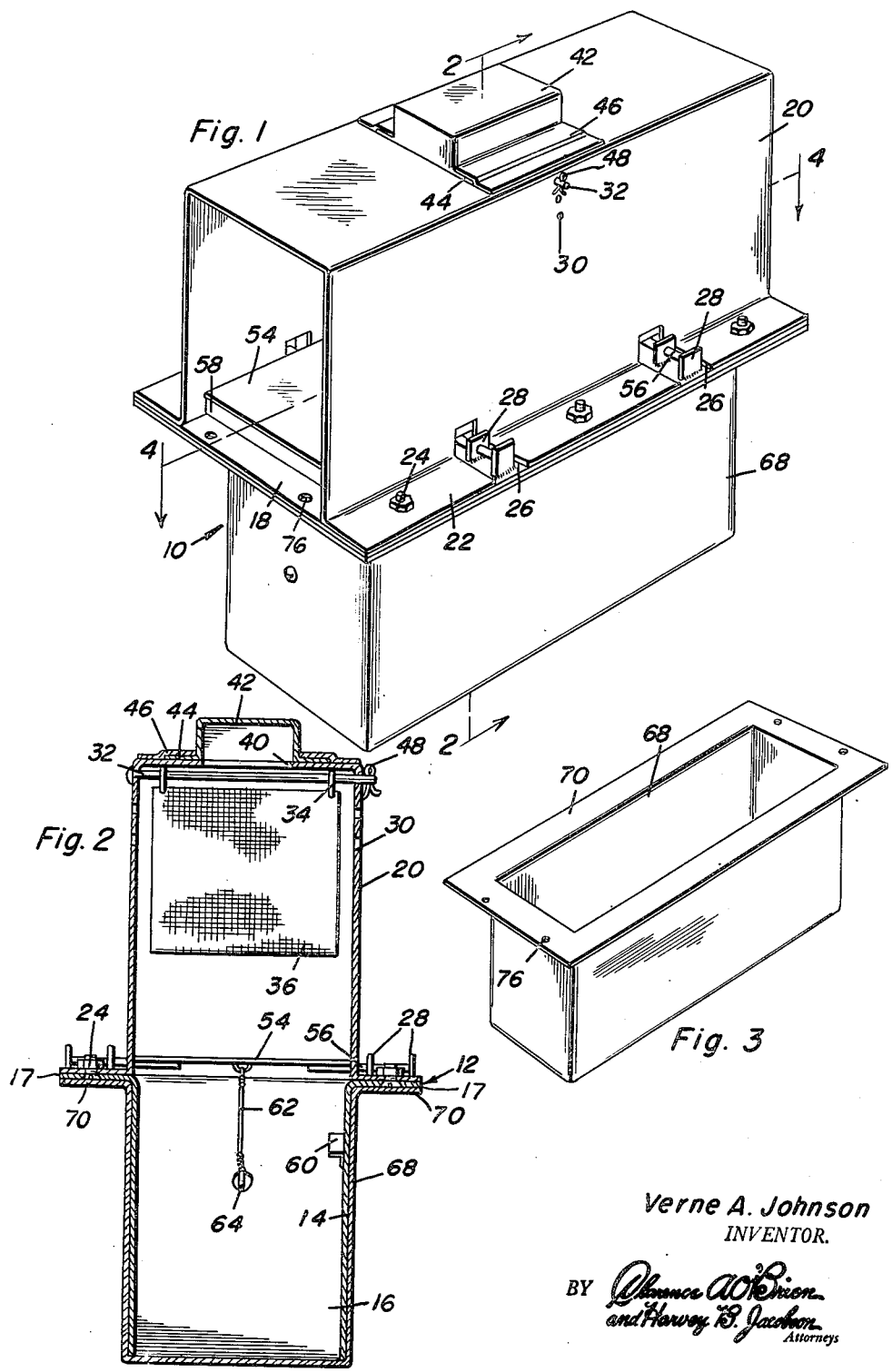

United States Patent Office 2,766,550
Patented Oct. 16, 1956

2,766,550

RAT TRAP

Verne A. Johnson, Springfield, Minn.

Application April 16, 1954, Serial No. 423,690

1 Claim. (Cl. 43—69)

This invention relates to a rat trap and more specifically provides an improved structure for efficiently trapping rodents or the like and which remains in a set condition with only an infrequent renewal of bait being necessary.

An object of this invention is to provide a rat trap of simple construction including a pair of pivotal gates or closures which are actuated by the weight of the trapped animal, thereby depositing the animal into an escape-proof compartment.

Another object of this invention is to provide a rat trap which is relatively silent in operation, wherein rats adjacent the trap will not be scared away due to the actuation of the trap.

Still a further important object of this invention is to provide a rat trap that may be utilized to trap animals in an unharmed condition or to immediately kill such animals by drowning.

Yet another object of this invention is to provide a rat trap which is easily reloaded with bait and adaptable to various sizes for use in various locations.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a perspective view of the rat trap of the present invention;

Figure 2 is a vertical section taken substantially along section line 2—2 of Figure 1 showing the details of construction of the rat trap;

Figure 3 is a perspective view showing the detachable tank fitted on the bottom portion of the rat trap;

Figure 4 is a top plan section taken substantially along section line 4—4 of Figure 1 showing the details of construction of the pivotal closure for the opening in the main body;

Figure 5 is a longitudinal vertical section taken substantially along the center line of the rat trap showing the pivotal closure being actuated by a rat; and Figure 6 is a perspective detail view showing the mounting means for the bait container in the inverted channel-shaped member.

Referring now specifically to the drawings, it will be seen that the numeral 10 generally designates the rat trap of the present invention. The rat trap 10 is generally formed from a main body member 12 having depending vertical side walls 14 and vertical end walls 16 forming an enclosure. The main body portion 12 is provided with side and end ledges 17 and 18 and the end ledges 18 extend to each side of the depending end members 16. An inverted channel-shaped member 20 is positioned over the main body member 12 and forms a tunnel for a purpose described hereinafter. The channel-shaped member 20 is provided with outwardly extending flanges 22 for attachment to ledges 17 of the main body member 12 by suitable fastening bolts 24. The flanges 22 of the inverted channel member 20 are provided with slots 26 for positioning a pair of upstanding lugs or ears 28 rigidly secured to the main body member 12. A pair of the slots 26 is provided on each flange 22 and two pairs of the upstanding ears 28 are provided on each ledge 17 for a purpose described hereinafter. The upper portion of the inverted channel-shaped member 20 is provided with a plurality of vertically spaced and aligned apertures 30 on each side wall thereof for adjustably receiving a cross pin 32 which is inserted through selective holes 30 and through a pair of loop members 34 positioned on the open end of a screen receptacle 36. The screened receptacle 36 is provided for holding bait 38 for a purpose described hereinafter. The bight portion of the channel-shaped member is provided with an access opening 40 and an inverted, box-like closure 42 therefor which is provided with outwardly extending flanges 44 for reception under a pair of guides 46 secured to the upper surface of the bight portion of the U-shaped channel 20. The box-like member 42 provides a closure for the aperture 40. The removable transverse pin 32 is secured in position by a removable pin 48 wherein the bait receptacle 36 may be removed through the opening 40 for replacement of the bait 38. Also, the pin 32 may be vertically adjusted by positioning in selective pairs of apertures 30 and the loops 34 surrounding the pin 32 permit the bait receptacle 36 to pivot about the axis formed by the pin 32 when the bait receptacle 36 is moved by a rodent or the like.

Referring now specifically to Figure 5, the inner edges of the ledges 18 form an opening designated by the numeral 50. A pair of pivotal closure members or gates 52 and 54 are pivoted on a pair of transverse pins 56 which are journaled in the upstanding lugs 28. The lugs 28 are arranged in pairs with the inner lug 28 receiving the transverse pin 56, and the pin 56 abuts the outer of the pair of lugs 28, thereby positioning the pin 56 therebetween. The end of the pivotal members 52 and 54 which are remote from each other and are remote from the bait receptacle 36 are weighted as indicated by the the number 58, thereby returning the pivotal members 52 and 54 to a horizontal position and forming a closure for the opening 50. A pair of lugs 60 are provided on the depending side walls 14. These lugs 60 form stops for limiting the downward pivotal movement of the inner or adjacent ends of the pivotal closures 52 and 54. A flexible line 62 is disposed between the inner end of each of the pivotal closures 52 and 54 and a loop 64 on the depending end walls 16. The flexible line 62 may be varied in length in order to limit the return movement of the pivotal closures 52 and 54 under the impetus of the weighted ends 58, thereby preventing the weighted ends 58 from banging or making hard contact with the ledges 18 and thereby producing a noise and and scaring away adjacent rats that may be about ready to enter the trap pen. Further, as seen in Figure 5, a pair of runways 66 may be provided for gaining entrance into the trap 10.

As specifically shown in Figure 3, a receptacle or tank 68 having peripheral flanges 70 is provided for telescopic connection with the depending side and end walls 14 and 16, thereby forming a closure for the lower end of the trap 10. The tank 68 may be partially filled with water 72, as shown in Figure 5 or other suitable liquid for immediately drowning a rat 74 or some other rodent. The ledges 18 and flanges 70 are provided with suitable openings 76 for securing the rat trap in an opening in a floor, or the like, thereby eliminating the use of the runways 66 in an obvious manner. The tank 68 may be utilized without the water 72 wherein animals may be trapped without harm thereto. As shown in Figure 4, each transverse pin 56 extends only partially across the bottoms of the pivotal closures 52 and 54.

In operation, a rat or rodent 74 attempts to reach the bait 38 by crossing one of the pivotal closures 52 and 54. As the bait 38 swings about the pin 32, the rat 74 will naturally proceed towards the center portion of the opening 50. When he overbalances the weighted ends 58 of the pivotal closures 52 and 54, the inner ends of the pivotal closures 52 and 54 will pivot downwardly about the pivot pins 56, thereby depositing the rat 74 into the tank 68, which is partially filled with water 72, thereby drowning the rat 74. The weighted ends 58 tend to urge the pivotal closures 52 and 54 back to a normal horizontal position. The flexible line 62 permits the members 52 and 54 to pivot to a point just out of contact with the ledges 18, thereby preventing any loud contact which would ordinarily scare other approaching rats away. Obviously, the size of the retaining receptacle 68 may be varied as desired. Further, the device may be constructed of any readily obtainable sheet material or the like which lends itself to economic manufacture and reasonable cost.

Since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A rat trap comprising a main body member having an enlarged central opening defined by depending side and end walls, the portion of said body member disposed outwardly of the walls forming side and end ledges, an inverted channel-shaped member disposed on said body member and forming a tunnel, said channel-shaped member having outwardly extending flanges disposed on said side ledges, fastening means securing said flanges on the ledges thereby mounting the channel-shaped member on the main body member, said channel-shaped member having two pairs of transversely aligned slots extending inwardly from the free edges of the flanges and upwardly into the walls thereof, each of said side ledges having two pairs of transversely aligned upstanding lugs received in said slots in the flanges, transverse pins journaled in said lugs, a closure member mounted on each pin, said closure members being adapted to have adjacent edges substantially in abutting relation at the center of the opening in the body member, the remote ends of the closure member being weighted and extending over the edges of the opening whereby the closure members form a closure for the opening and are normally retained in a horizontal closed position by the weighted remote ends of the closure members, a flexible line interconnecting the end walls and the adjacent ends of the closure member for limiting the closing movement thereof to prevent the remote ends of the closure members from striking the upper surface of the main body member, stop members projecting from one depending side wall for limiting downward pivotal movement of the adjacent ends of the closure members, a tank enclosure having vertical walls telescopically receiving the depending walls on the main body member, said tank walls having outwardly extending flanges underlying and separable from the ledges on the main body member to permit access to the interior of the enclosure for removing trapped rats, said channel shaped member having a bight portion provided with a centrally disposed opening therein, an inverted box-like closure for said opening in the bight portion, means detachably securing the box-like closure in position for closing the opening in the bight portion, a transverse pin underlying the opening in the bight portion, a bait receptacle of screen wire material, ring members suspending the bait receptacle from the transverse pin above the adjacent ends of the closure members whereby a rat must be disposed on the inner end of one of said closure members to reach the bait receptacle, said closure members being adapted to have the adjacent ends pivoted downwardly by the weight of a rat for dumping the rat into the tank enclosure, and ramps extending from each end of the main body member to an adjacent supporting surface for forming a runway for rats entering the tunnel.

References Cited in the file of this patent

UNITED STATES PATENTS

| | | |
|---|---|---|
| 547,826 | Wallace | Oct. 15, 1895 |
| 830,009 | Salisbury | Sept. 4, 1906 |
| 852,009 | Wolf | Apr. 30, 1907 |
| 861,222 | Newlove | July 23, 1907 |
| 960,170 | Harman | May 31, 1910 |
| 1,108,657 | Aldeman | Aug. 25, 1914 |
| 1,464,358 | Gnoinsky | Aug. 7, 1923 |
| 2,218,403 | McKee | Oct. 15, 1940 |

FOREIGN PATENTS

| | | |
|---|---|---|
| 11,640 | Great Britain | 1913 |
| 164,631 | Great Britain | June 16, 1921 |
| 526,444 | Great Britain | Sept. 18, 1940 |